United States Patent
Fornasier et al.

(10) Patent No.: US 11,850,598 B2
(45) Date of Patent: Dec. 26, 2023

(54) METHOD FOR SHREDDING PORTIONS OF BITUMINOUS MATERIAL INTO RECYCLABLE GRANULES

(71) Applicant: EUROLINE S.R.L., Maserada sul Piave (IT)

(72) Inventors: Antonio Fornasier, Maserada sul Piave (IT); Alessandro Pavan, Maserada sul Piave (IT)

(73) Assignee: EUROLINE S.R.L, Maserada sul Piave TV (IT)

( * ) Notice: Subject to any disclaimer, the term of this patent is extended or adjusted under 35 U.S.C. 154(b) by 238 days.

(21) Appl. No.: 17/321,308

(22) Filed: May 14, 2021

(65) Prior Publication Data

US 2021/0354147 A1 Nov. 18, 2021

(30) Foreign Application Priority Data

May 14, 2020 (IT) .......................... 102020000011101

(51) Int. Cl.
*B02C 18/22* (2006.01)
*B02C 18/14* (2006.01)

(52) U.S. Cl.
CPC .......... *B02C 18/2233* (2013.01); *B02C 18/14* (2013.01)

(58) Field of Classification Search
CPC ........ B02C 18/14; B02C 18/2233; B01J 2/20; B29B 17/04; C10C 3/14
USPC ......................................................... 241/280
See application file for complete search history.

(56) References Cited

U.S. PATENT DOCUMENTS

| 5,473,903 A * | 12/1995 | Lloyd ..................... B30B 11/26 62/384 |
| 5,525,052 A * | 6/1996 | Czarnetzki .............. B29B 13/10 425/185 |
| 2003/0021991 A1* | 1/2003 | Sugayoshi ............ B30B 11/227 264/143 |
| 2011/0084418 A1* | 4/2011 | Fornasier .................. C10C 3/14 264/141 |
| 2012/0211914 A1* | 8/2012 | Walker .................. B30B 11/006 425/150 |

FOREIGN PATENT DOCUMENTS

| EP | 2237868 B1 | 3/2013 |
| WO | 2008103035 A1 | 8/2008 |

OTHER PUBLICATIONS

The Search Report for Italian Application No. 102020000011101 dated Jan. 27, 2021, 7 pages.

* cited by examiner

*Primary Examiner* — Debra M Sullivan
*Assistant Examiner* — Matthew Stephens
(74) *Attorney, Agent, or Firm* — Womble Bond Dickinson (US) LLP (57) ABSTRACT

A machine for shredding portions of bituminous material in the solid-state into granules in the solid-state. The machine comprises a pressing member provided with a piston which is axially mobile inside a perforated tubular body along an axis and is provided on the head thereof with an internal concave portion having a shape substantially complementary to a projecting part present in an axial end of the perforated tubular body. On the head of the piston through-openings are made, which extend radially along a direction approximately transversal to the axis and are in communication with the internal space of the concave portion.

10 Claims, 10 Drawing Sheets

METHOD FOR SHREDDING PORTIONS OF BITUMINOUS MATERIAL INTO RECYCLABLE GRANULES

CROSS-REFERENCE TO RELATED APPLICATIONS

This Patent Application claims priority from Italian Patent Application No. 102020000011101 filed on May 14, 2020, the entire disclosure of which is incorporated herein by reference.

TECHNICAL FIELD

The present invention relates to a machine and to a method for shredding portions/waste of bituminous-based material in the solid-state into granules of small dimensions.

BACKGROUND ART

The need to recycle products/waste of bituminous-based material is known. Such products generally consist of, or derive from the production or from the use of, bituminous membranes, bituminous films, bituminous tiles and other bitumen-based articles typically used in the building sector.

In order to be able to make the aforementioned products or pieces of waste recyclable, it is necessary to subject them to a fragmentation/shredding process which reduces them into granules/fragments of extremely small dimensions, suitable so that the recycle granules can then be used in the production processes of new products.

To this purpose, machines have been manufactured which crush the products/waste of bituminous material into the aforementioned recyclable granules.

Some types of machines mentioned above carry out the aforementioned fragmentation by means of a so-called "hot" process. Such process envisages to heat the bituminous waste loaded inside a hot chamber so as to soften the waste material and bring it into a semisolid state, to shred into granules the semisolid waste material by means of a rotating cutting head, and to cool the granules.

A technical problem of the aforementioned machines is the low energy efficiency due to the implementation of the heating and cooling steps. Furthermore, the aforementioned machines are subject to a non-negligible percentage of incomplete fragmentation of the waste.

In order to overcome the above-described technical problems, the Applicant has devised a machine which performs a "cold" process and carries out an efficient and complete shredding of the waste of bituminous-based material without implementing the heating and cooling step. Such machine is described in the European patent N. EP 2 237 868 B1 of the Applicant and comprises a perforated tubular body which extends along an axis, a pressing member which pushes the material/waste inside the perforated tubular body. The tubular body has an internal end shaped so that under the pressure exerted by the pressing member, the materials/waste are pushed against the wall of the tubular body and pass through the holes of the perforated tubular body causing the extrusion of filiform portions of bituminous material. The machine further comprises a cutting member which cuts the filiform portions extruded from the holes of the perforated tubular body so as to shred them into granules.

DISCLOSURE OF THE INVENTION

Aim of the present invention is to realize a machine of perfected type for "cold" shredding the bituminous material, which is capable of increasing the performance in terms of efficiency of the shredding of the above-described machine.

According to the present invention, a machine for shredding portions of bituminous material in the solid-state into recyclable granules is realized as claimed in the respective appended claims.

BRIEF DESCRIPTION OF THE DRAWINGS

The present invention will now be described with reference to the accompanying drawings, which illustrate a non-limiting example embodiment thereof, wherein.

BEST MODE FOR CARRYING OUT THE INVENTION

Figure 1:
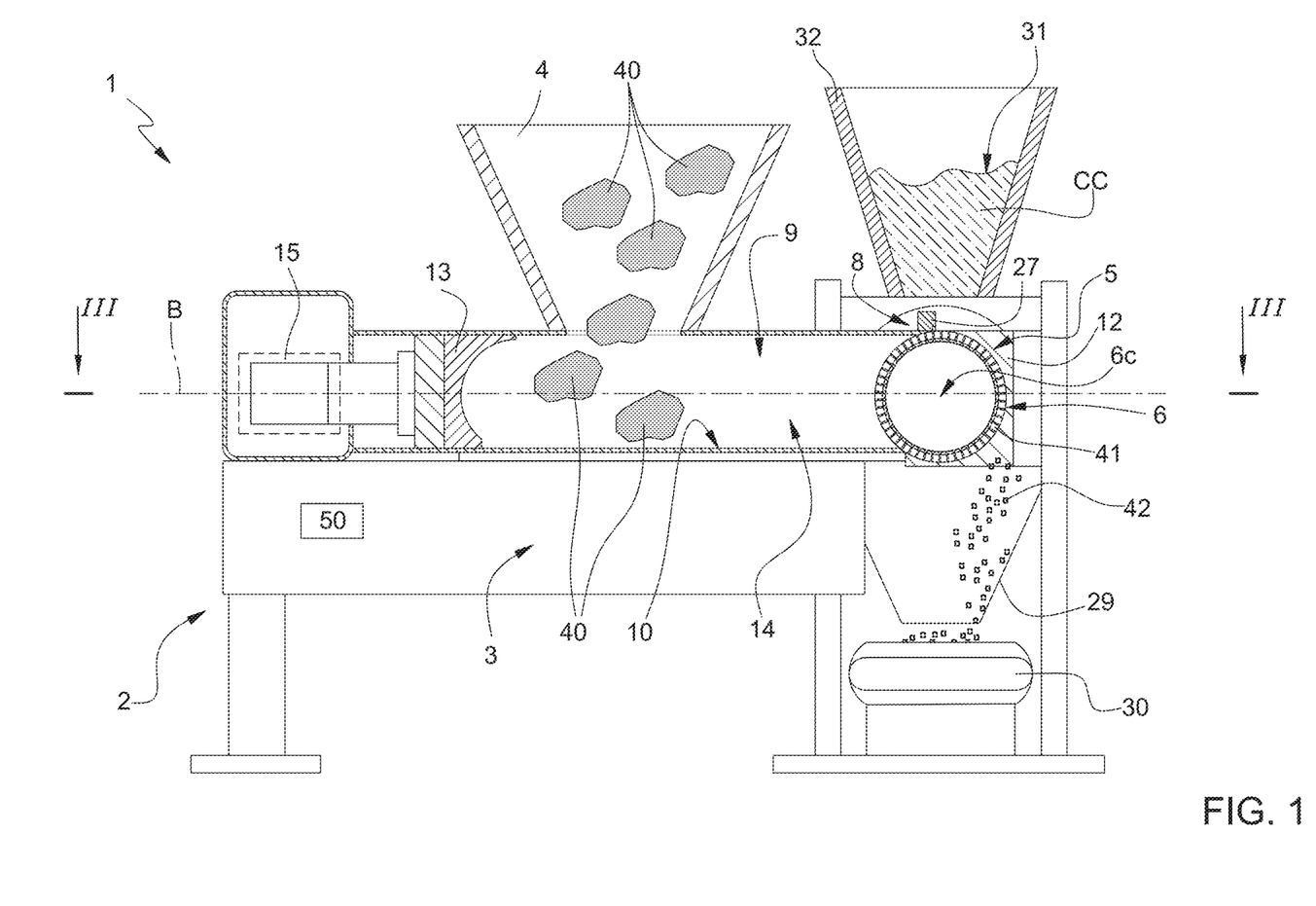
FIG. 1 shows a schematic view in side elevation, with parts in section and parts removed for clarity, of a machine for cold shredding portions of bituminous material into granules, realized according to the teachings of the present invention.

With reference to FIG. 1, reference numeral 1 denotes, as a whole, a machine which is adapted to shred/fragment portions of bituminous material 40 into granules 42.

In the following description, the term "portions of bituminous material" means: waste of solid bituminous products (in a solid state), waste bituminous products (already used), complete rolls or sheets of bituminous material, complete rolls or sheets of bituminous material having a low content of bitumen and/or a high content of polyester, bituminous membranes, bituminous films, bituminous tiles and other similar bitumen-based products used in the building sector.

The granules 42 obtained from the machine 1 are conveniently recyclable granules 42 with a reduced thickness, which are suitable to be used in a following process for manufacturing new products of bituminous material, such as for example the bitumen-based products used in the building sector to which the aforementioned waste is associated.

The machine 1 comprises: a compacting unit 3, a hopper 4, a shredding unit 5, which are preferably supported by a support frame 2 resting on a plane (ground).

Figure 4:
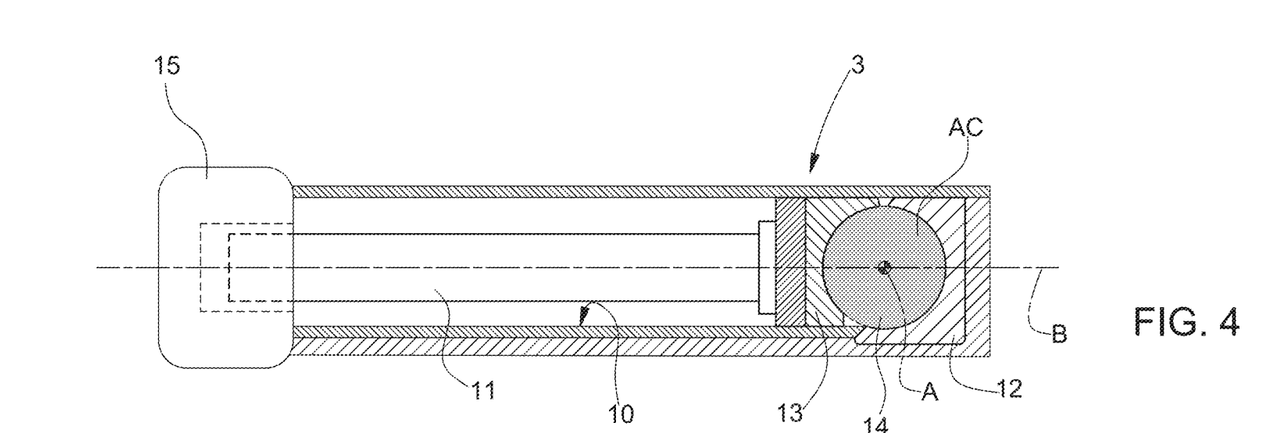

The frame 2, the compacting unit 3 and the hopper 4 can be preferably manufactured according to what described in the European patent EP 2 237 868 B1 of the Applicant, whose contents (description and drawings) are deemed to be completely incorporated herein by way of reference. Preferably, the compacting unit 3 is structured to receive from above the portions 40 by means of the hopper 4 and compresses them so as to form a compact agglomerate AC (FIG. 4).

The shredding unit 5 is structured to "cold" shred the compact agglomerate AC into the granules 42, by means of an extrusion and cutting process described in detail in the following.

With reference to FIGS. 1, 2, 8-13, the shredding unit 5 essentially comprises a perforated tubular body 6, which extends along a longitudinal axis A, a pressing member 7 adapted to push the portions 40 inside the perforated tubular body 6 so as to force by compression the bituminous material to radially come out through the holes of the perforated body 6, so as to obtain a plurality of substantially filiform extruded portions 41 of the bituminous material, and a cutting member 8 adapted to cut the extruded portions 41 (FIG. 13) coming out of the holes, so as to obtain the granules 42.

According to the preferred embodiment shown in FIGS. 1-4, the compacting unit 3 comprises a box-like body 9 with a substantially parallelepiped shape, which extends along a longitudinal axis B transverse to the longitudinal axis A and comprises, in turn, a base plane 10 with a substantially rectangular shape fixedly connected to the frame 2.

Figure 2:
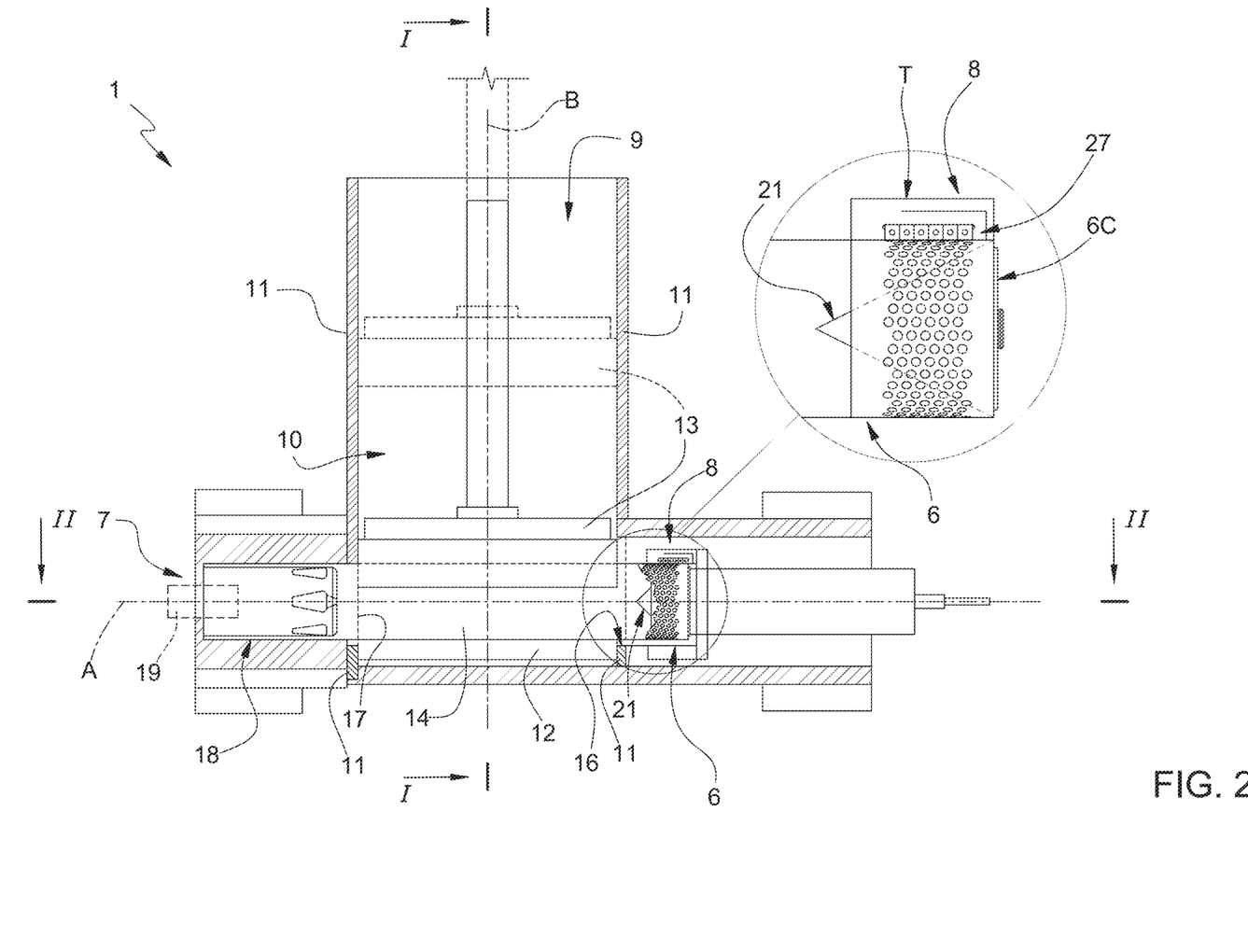
FIG. 2 is a top plan schematic view, with parts in section and parts removed for clarity, of the machine shown in FIG. 1, FIGS. 3 and 4 illustrate the compacting unit of the machine shown in FIG. 1 in a first and in a second operating position according to a section I-I of FIG. 2.

According to the preferred embodiment shown in FIG. 2, the box-like body 9 further comprises a pair of side containment walls 11, which extend (upwards) from the opposite sides of the base plane 10 and lie on respective planes parallel to the axis B. Preferably, the base plane 10 is approximately horizontal. The side containment walls 11 are rectangular and approximately vertical.

The box-like body 9 further comprises a pair of walls 12 and 13, each of which extends parallel to the longitudinal axis A. The wall 12 is preferably fixed and is arranged at a first end of the base plane 10 (along the axis B) in a position adjacent the shredding unit 5 and extends approximately orthogonal to the longitudinal axis B.

The wall 13 is opposite the wall 12 (along the axis B) and is mounted mobile along the axis B in such a way so that it can be moved in the box-like body 9 from and towards the wall 12. The wall 13 is structured to slide with its own bottom edge approximately resting on the base plane 10 from and towards the fixed wall 12 so as to form with the latter and with the side containment walls 11, a variable-volume compacting inner chamber 14.

According to the preferred embodiment shown in FIG. 1, the compacting unit 3 is further provided with an actuator member 15 comprising a movement mechanism, for example a linear electric actuator or any other type of similar actuator moved preferably, but not necessarily, by an electric motor, adapted to displace the wall 13 along the axis B from and towards the wall 12.

The actuator member 15 is adapted, upon command, to displace the wall 13 between a loading position of the portions 40 (FIG. 3), in which the mobile wall 13 is set back (moved away from the wall 12) in a position such not to interfere with the unloading mouth of the above hopper 4 for allowing the loading of the portions 40 in the box-like body 9, and a compacting position (FIG. 4), in which the mobile wall 13 is arranged set forward along the axis B so as to be approximately resting against the wall 12.

Figure 3:
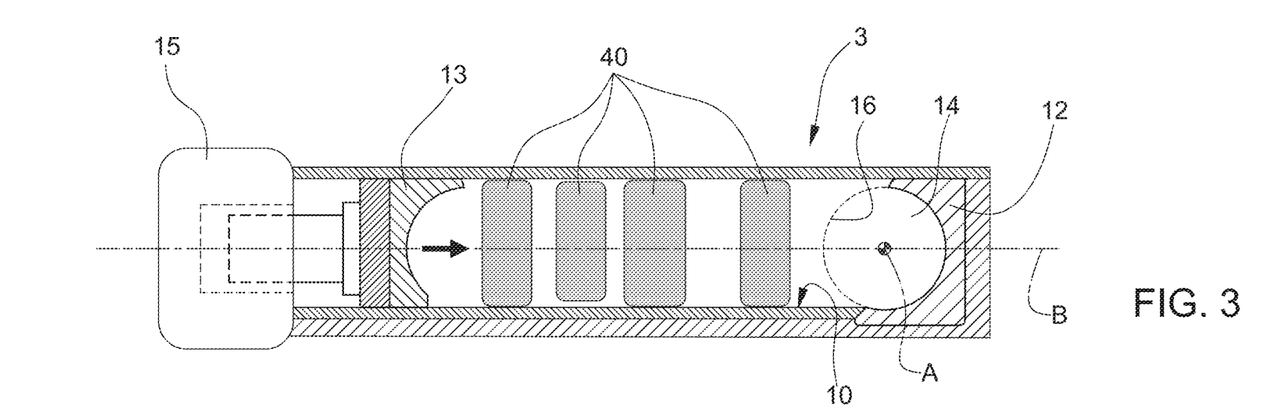

In this case, when the wall 13 is in the loading position, the variable-volume chamber 14 has a first volume, sized to contain a given quantity of portions 40 loaded from above by means of the hopper 4 (FIG. 3). In the compacting position, the variable-volume chamber 14 has a second volume which is smaller than the first volume, and is sized to compact (squash) the portions 40 so as to obtain the compacted agglomerate AC (FIG. 4).

According to the preferred embodiment shown in FIGS. 3 and 4, the two walls 12 and 13 are shaped so as to have preferably, but not necessarily, respective half-cylindrical concave shapes, i.e. semicircle cross-sections. Conveniently, when the wall 12 is in the compacting position, the inner face thereof forms with the adjacent inner face of the wall 13, an internally tubular body which extends coaxial to the axis A and has an internal section transversal to the axis A, substantially circular (FIG. 4).

With reference to FIG. 2, the internally tubular body has an axial open end (along the axis A) communicating, by means of a through-opening 16 made on the side wall 11, with the inlet of the perforated tubular body 6 so as to make the internally tubular body axially contiguous and communicating with the tubular body 6, and the opposite open end, which is contiguous and communicates, preferably by means of an opening 17 made on the other side wall 11, with the pressing member 7.

With reference to FIG. 2, the tubular body 6 comprises in turn a perforated cylindrical barrel 20 which extends coaxially to the longitudinal axis A. The perforated cylindrical barrel 20 can be connected to the box-like body 9 preferably, but not necessarily, by means of a connection tubular element having approximately the same inner diameter of the perforated tubular body 6.

In the example shown in FIGS. 2, 8-12, one axial end of the tubular body 6 is closed by means of a plane bottom wall orthogonal (vertical) to the longitudinal axis A. The bottom wall 6c centrally has a projecting part 21, which extends coaxial to the longitudinal axis A so as to protrude in the internal space of the tubular body 6.

According to a preferred embodiment shown in FIGS. 2, 5-12, the pressing member 7 comprises a piston 18 which is mounted mobile along the longitudinal axis A. The piston 18 can comprise a body of rigid material, preferably metallic of cylindrical shape, which develops coaxial to the axis A and has on the free end thereof facing the projecting part 21, i.e. on the head thereof, a concave portion 22. The concave portion 22 is made on the head so as to be coaxial to the axis A and has a shape substantially complementary to the projecting part 21 so as to internally accommodate the same.

According to a preferred embodiment schematically shown in FIG. 2, the pressing member 7 further comprises a movement device 19 (shown only schematically), which is adapted to displace the piston 18 along the axis A so as to axially pass through the chamber 14 and the cylindrical barrel 20, and vice versa.

Figure 8:
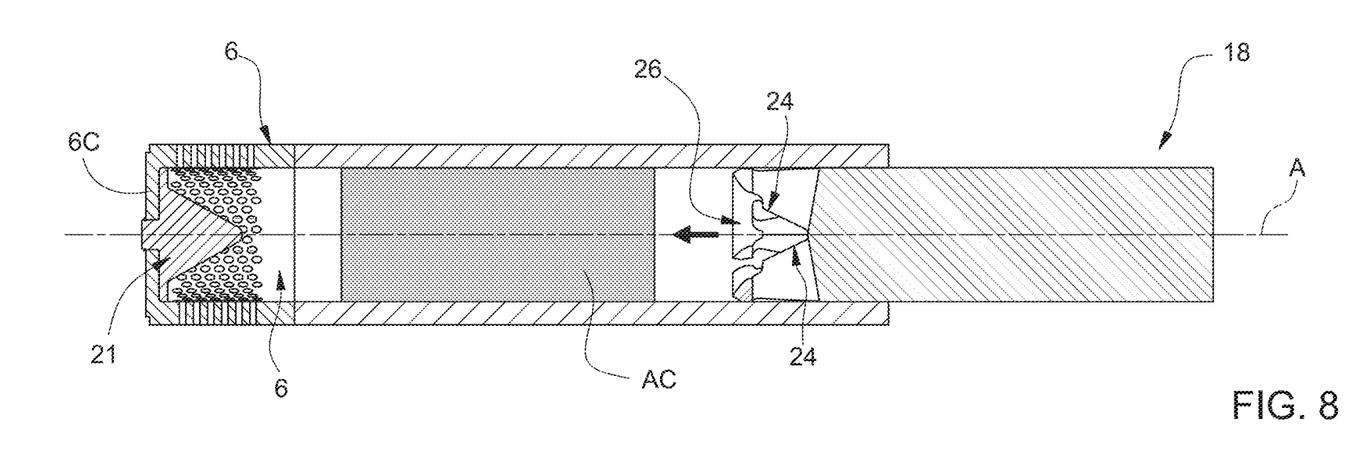
Figure 9:
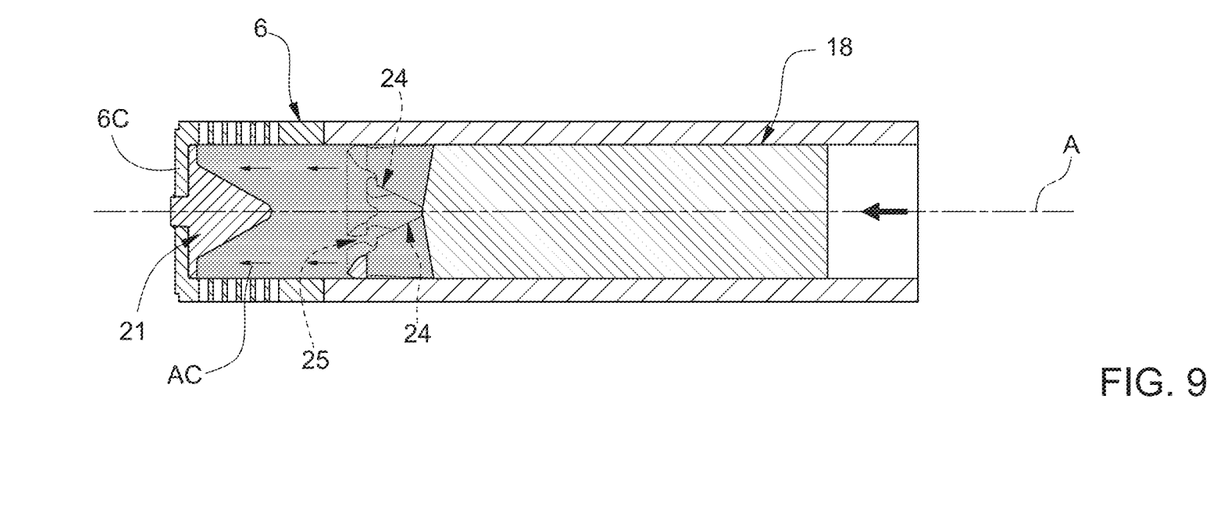
Figure 10:
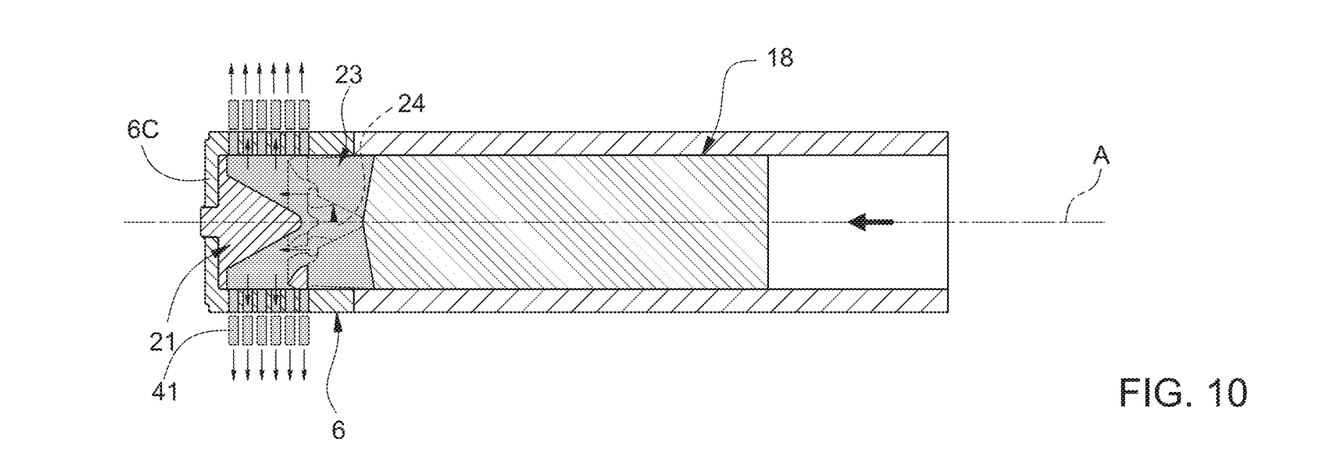
Figure 12:
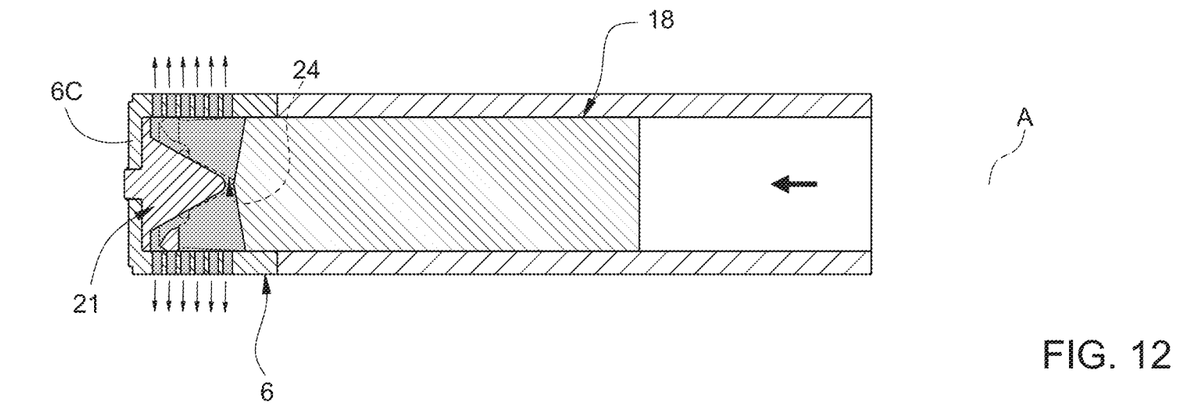
Figure 13:
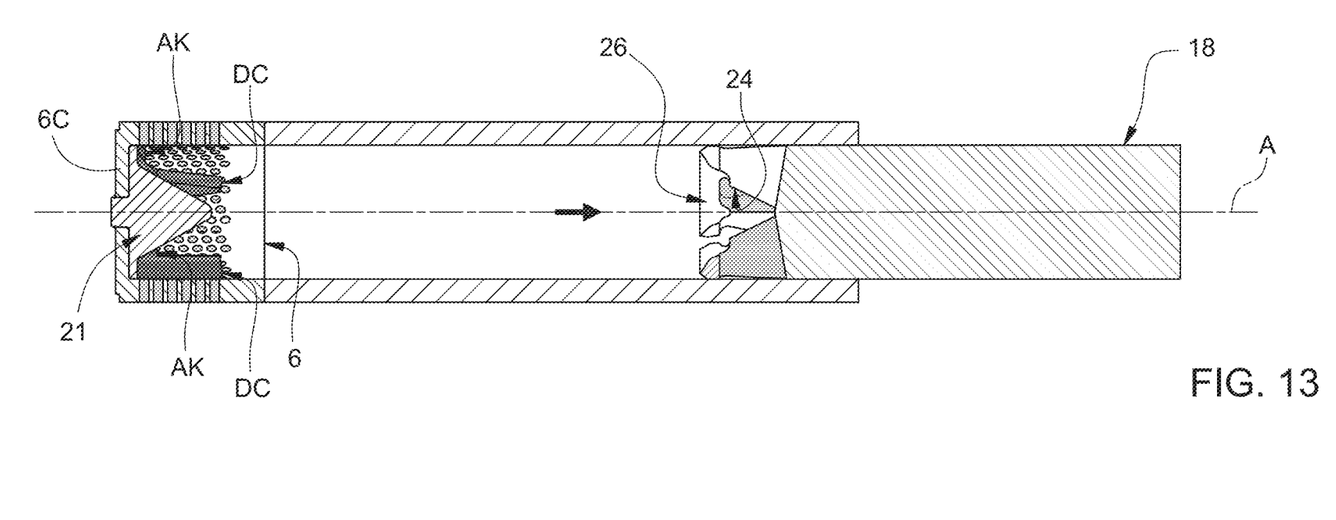
Figure 14:
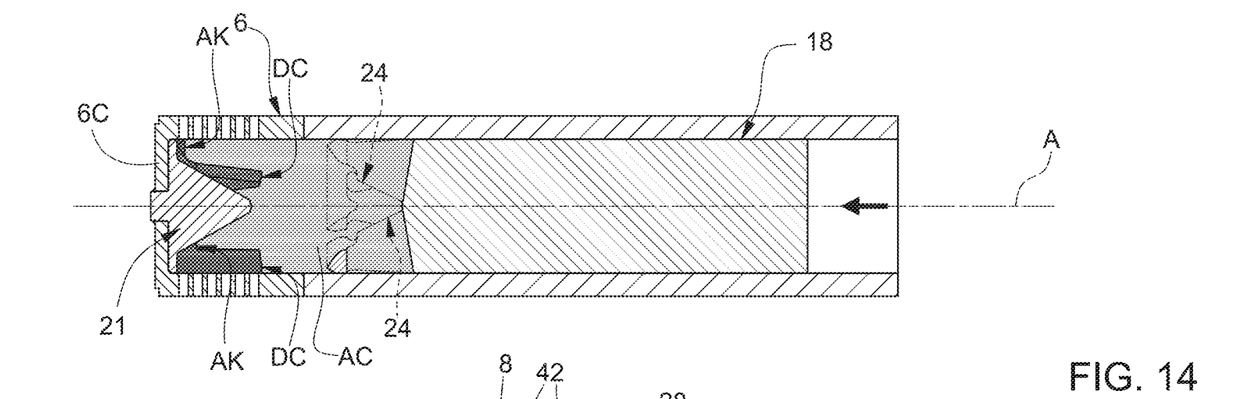

Preferably, the movement device 19 is adapted to axially displace the piston 18 between: at least one first position, schematically shown in FIG. 8, in which the piston 18 is extracted from the perforated barrel 20 and from the chamber 4, and at least one second position, shown in FIG. 12, in which the head of the piston 18 is inside the perforated barrel 20 so that its concave portion 22 is engaged by the projecting part 21 of the tubular body 6.

With reference to the preferred embodiment shown in FIGS. 8-12, the projecting part 21 is shaped so as to divert the direction of the axial compression exerted by the piston 18 on the compacted agglomerate AC present in the cylindrical barrel 20 in a radial direction so as to extrude the compacted agglomerate AC through the holes of the cylindrical barrel 20 itself so as to obtain filiform extruded elements 41.

Figure 5:
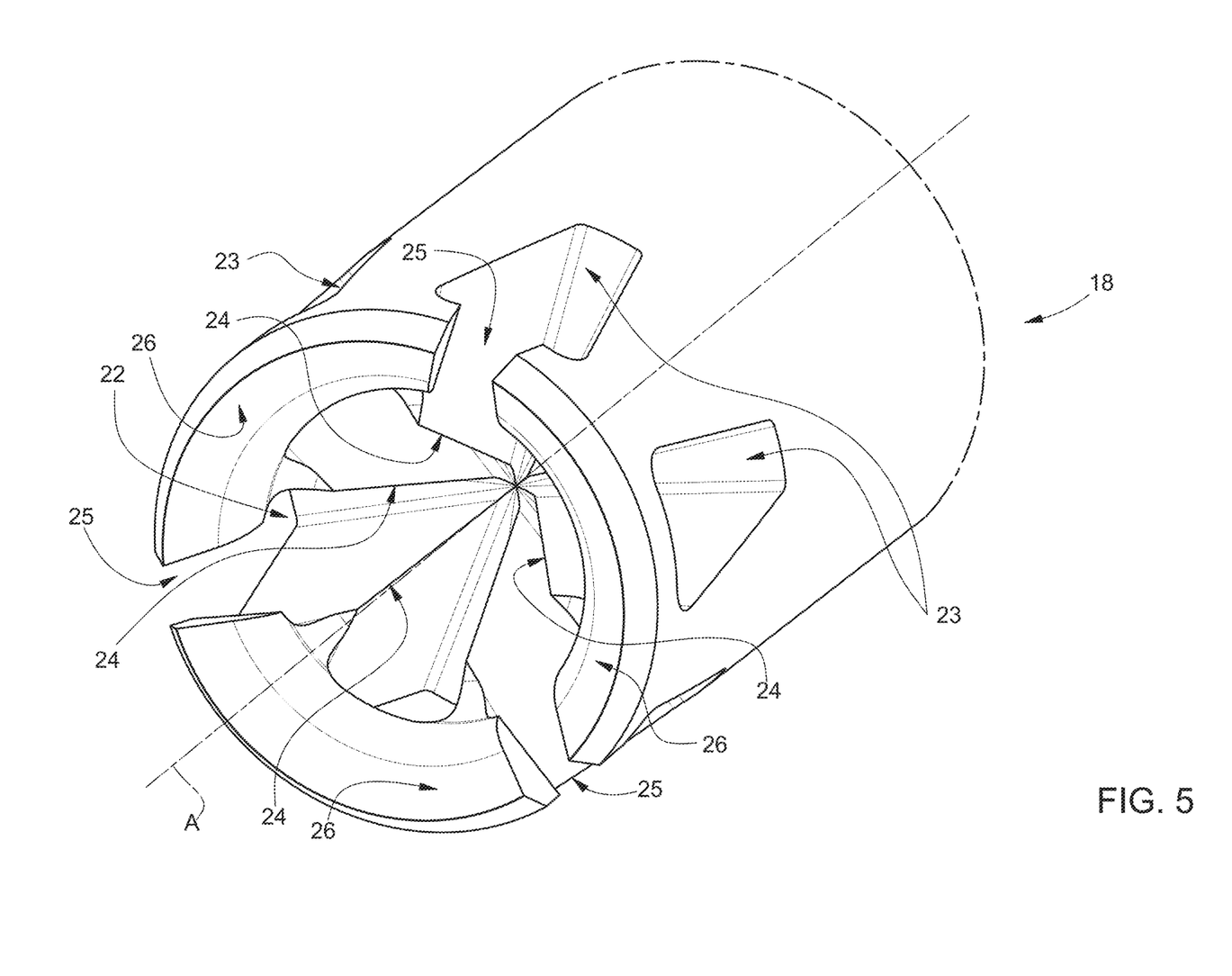
FIG. 5 shows an enlarged scale perspective view of a portion of head of the piston comprised in the shredding unit of the machine shown in FIG. 1, FIGS. 6 and 7 show two views in side elevation of the piston shown in FIG. 5 in two different angular positions of the piston about the longitudinal axis, Figures from 8 to 14 show as many schematic views, with parts in section and parts removed for clarity, which represent the functioning of the shredding unit of the machine shown in FIG. 1.
Figure 6:
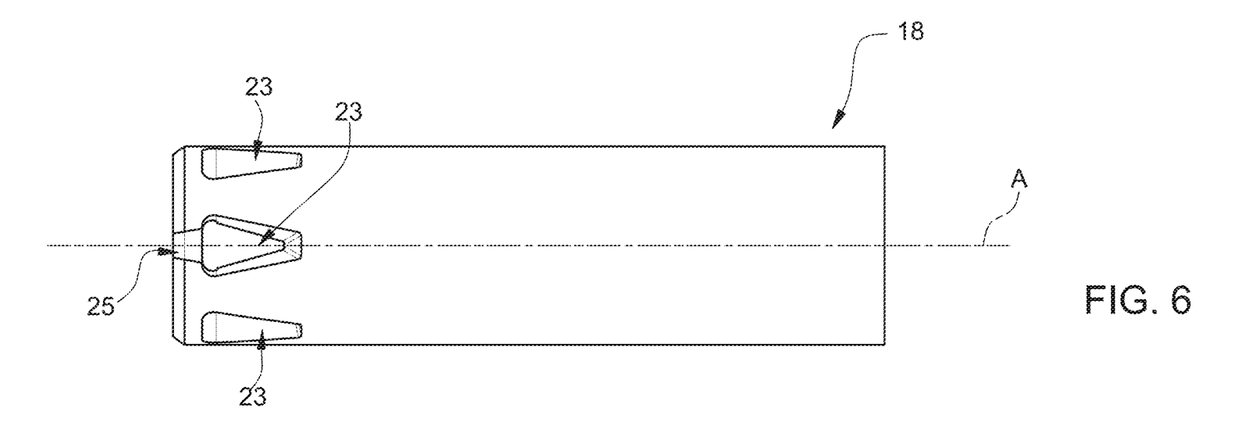
Figure 7:
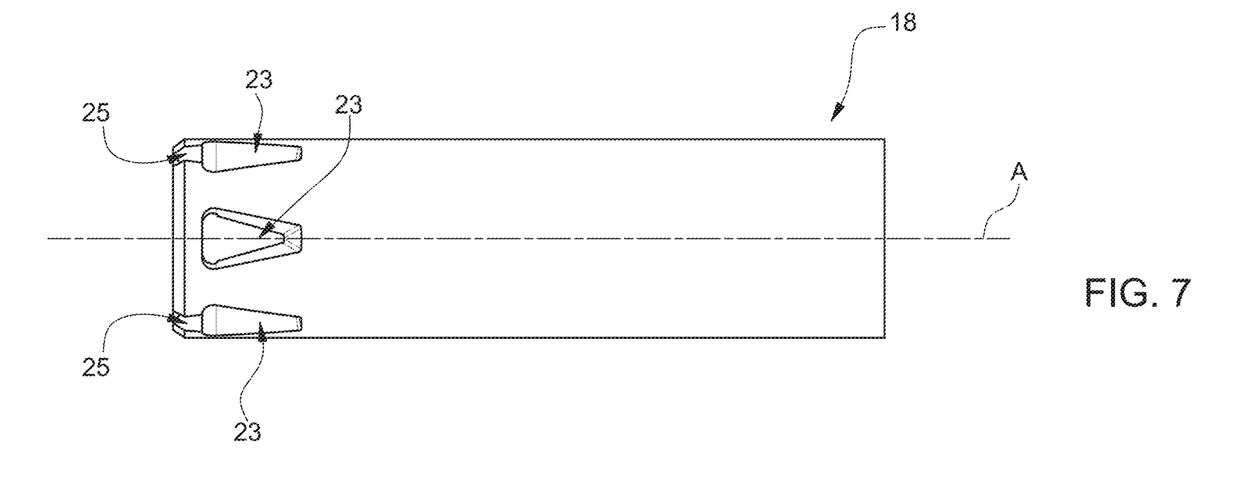

In the example illustrated in FIG. 5, the concave portion 22 and the projecting part 21 can have an approximately conical or approximately truncated-conical shape, and are sized so that, in use, the outer surface of the projecting part 21 is arranged substantially resting/in abutment against the concave portion 22 of the piston 18 when the latter is in its second position.

Figure 16:
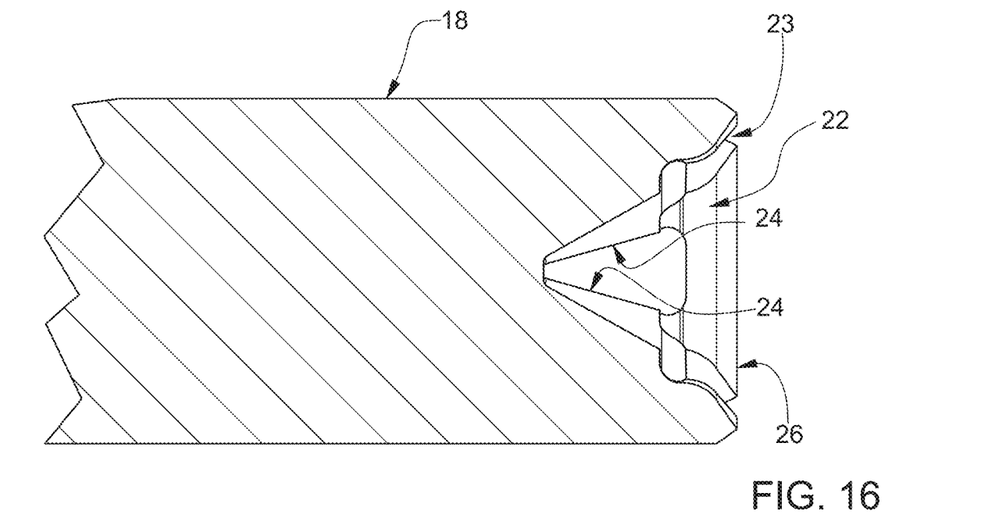
FIG. 16 is a longitudinal section of the piston of the shredding unit of the machine shown in FIG. 1.
Figure 17:
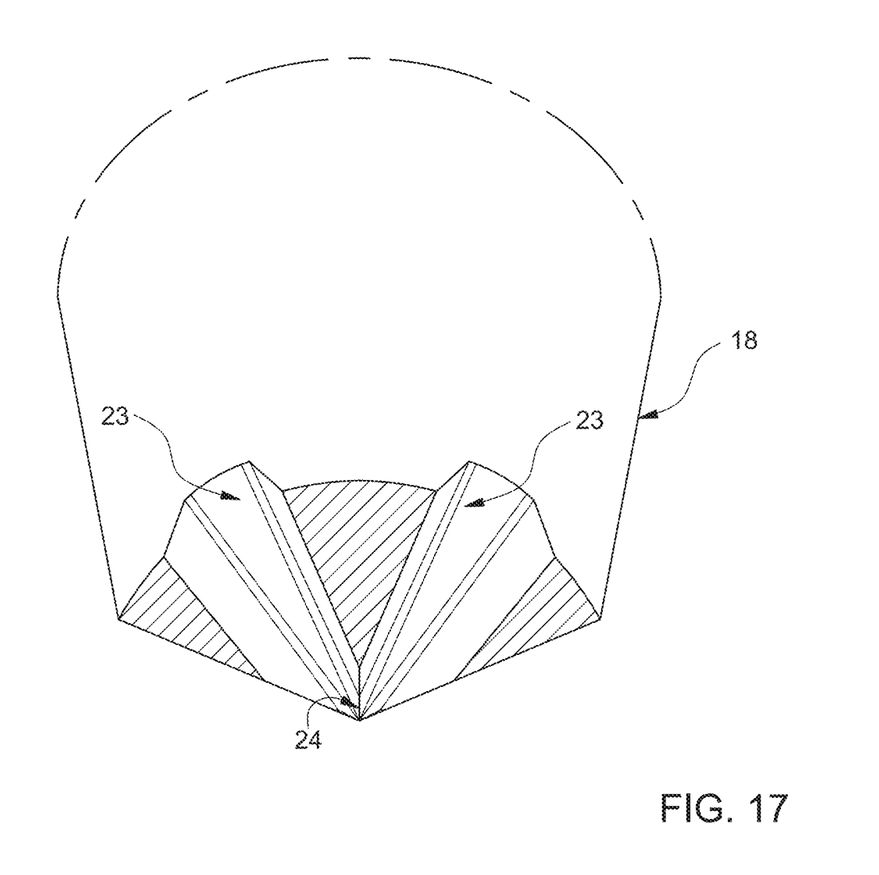
FIG. 17 is a cross-section of the head of the piston of the shredding unit of the machine shown in FIG. 1.

With reference to FIGS. 5, 16 and 17, on the head of the piston 18, around the concave portion 22, one or more radial through-openings 23 are further made which put the internal space of the concave portion 22 in communication with the through-holes of the cylindrical barrel 20.

The openings 23 made on the head of the piston 18 form unloading channels which in use conveniently allow the residual material which tends to accumulate in the concave portion 22 to be radially pushed by the projecting part 21 and thus unloaded from the concave portion 22 through the holes of the cylindrical barrel 20.

The radial openings 23 made in the piston 18 have the technical effect of conveniently emptying the residual material contained in the concave portion 22 when the piston 18 reaches the second position. This characteristic solves the technical problem of the accumulation of residual bituminous material in the concave portion 22 in the second position of the piston 18.

The Applicant, in fact, has found that in the absence of the openings 23, the piston 18 tends to accumulate bituminous material in the concave portion 22 and forms over time, reiterating the shredding cycles, a residual bituminous agglomerate having a non-negligible bulk and containing a relevant percentage of residuals/parts of compacted material having high hardness. Such residual bituminous agglomerate thus tends to form in the concave portion 22 a block of compact material of high hardness which prevents the completion of the axial movement of the piston 18 into its second position, thus causing a criticality in the functioning of the machine 1 in terms of completion of the extrusion.

The openings 23 made on the piston 18 further have the technical effect of increasing the radial compression exerted by the projecting part 21 against the residual bituminous agglomerate when the piston 18 accomplishes the last section of axial displacement towards the second position. During such displacement, the material is forced to pass through the holes of the cylindrical barrel 20 contained in a reduced area corresponding to that of the openings 23. In this manner, an increase in the pressure exerted against the bituminous agglomerate AC towards the barrel 20 is obtained, which conveniently allows completing the extrusion also of the residual portions accumulated in the concave portion 22 and having a hardness greater than that of the bitumen.

According to the preferred embodiment shown in FIGS. 5, 6, 7, 8 and 17 the through-openings 23 can be angularly spaced from one another on the head about the axis A. Preferably, the openings 23 can be angularly equidistant from one another on the head.

According to the preferred embodiment, the openings 23 have a section transversal to their radial development (on a plane substantially tangent to the outer surface of the piston 18 and parallel to the axis A) approximately trapezoidal. Preferably, the larger base of the openings 23 is approximately adjacent to the outer circular edge of the head of the piston 18.

Preferably, the openings 23 each have at least two internal walls which face one another and extend radially starting from the oblique sides of the trapezoid of the opening 23 present on the outer surface of the piston 18 to extend in the concave portion 22 towards the axis A. Each of the internal walls of the opening 23 is substantially plane, lies on a radial plane approximately coplanar to the axis A, and forms with the internal wall of the opening 23 angularly adjacent, a partition element 24.

According to the preferred embodiment shown in FIGS. 5, 6, 7, 8 and 17, the internal walls of the partition element 24 extend towards the axis A so as to form a partition edge at the concave portion 22 which is adapted in use to cut into the compacted agglomerate AC.

The partition elements 24 each have a cross section, on a plane orthogonal to the axis A, approximately triangular or wedge-shaped wherein the vertex facing the concave portion 22 defines the partition edge.

Preferably, the partition edge of the partition elements can be approximately rectilinear, and be tilted with respect to the axis A by an angle suited to allow the tilted edge (with respect to the axis A) of the partition edge to be arranged resting on the outer surface of the projecting part 21.

According to the preferred embodiment shown in FIGS. 5, 6, 7, 8 and 17, the partition edge of the partition elements 24 can have a cross-section suitable for the separation or for the cutting of the compacted agglomerate AC against the projecting part 21. The partition edge of the partition elements 24 can have an approximately sharp shape so as to be sharp-edged.

A technical effect of the partition elements 24 is to radially separate/cut/divide the residual compact agglomerate AC present between the concave portion 22 and the projecting part 21, when the piston 18 is about to reach the second position, in pieces/slices and to convey the same in the openings 23 so as to further improve the extrusion step of the compact agglomerate AC in the filiform elements 41 and thus its crushing into granules 42.

According to the preferred embodiment shown in FIGS. 5, 6, 7, 8 and 17, on the circular edge of the head of the piston 18 one or more longitudinal notches 25 are made which extend parallel to the axis A from the edge until reaching the larger base of the opening(s) 23. According to a preferred embodiment shown in FIG. 5, the longitudinal notches 25 are made on the head of the piston 18 according to a distribution such as to traverse the corresponding bases of the respective openings 23 in an angularly alternated manner.

In the example illustrated in FIG. 5, the longitudinal notches 25 are each delimited by two inner surfaces which develop radially from the concave portion 22 outwards and approximately face one another.

Preferably, the inner surfaces of the notches 25 are approximately plane and lie on respective planes tilted with respect to the axis A. Preferably the lying planes of the inner plane surfaces of the notches 25 are divergent with respect to one another in the direction of the relative adjacent opening 23.

A technical effect of the notches 25 in combination with the relative openings 23 is to form in the cylindrical chamber 20 wedge-shaped teeth DC (FIG. 13) of highly hard material which extend approximately parallel to the axis A and are adapted to stick in the outer layer of the compacted agglomerate AC during a shredding cycle following their forming so as to cooperate with the partition elements 24 in the action of division into slices of the compacted agglomerate AC.

According to a preferred embodiment, the annular edge of the head of the piston 18 is further shaped so as to have along its inner side, i.e. facing the concave portion 22, an annular seat or recess 26. Preferably, the annular recess 26 forms along the inner side of the edge of the head of the piston 18 a discontinuous circular ring which radially protrudes towards the concave portion 22.

The technical effect obtained from the annular recess 26 is, on the one hand, to hold the bituminous material inside the openings 23 devoid of incisions and, on the other hand, to create a circular connection crown AK of the wedge-shaped teeth DC which remains fitted on the projecting part 21, when the piston displaces from the second position to the first position.

Figure 15:
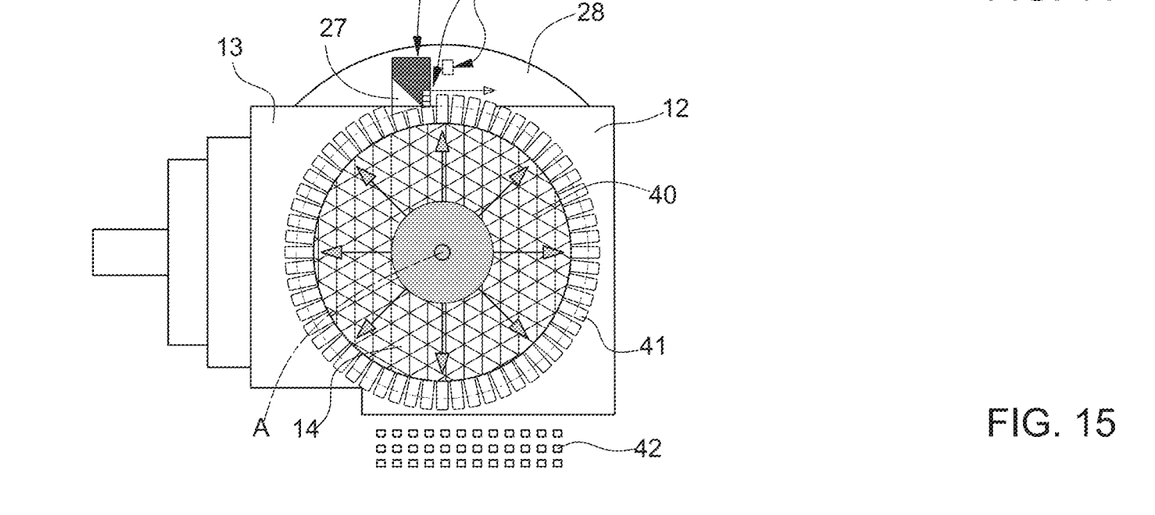
FIG. 15 is a schematic view of the functioning of the cutting member of the machine shown in FIG. 1.

With reference to FIG. 15, the cutting member 8 preferably comprises one or more tools 27 (of which only one is schematically shown in the FIG. 15) and a rotating head T (FIG. 2) which is adapted to rotate said tool(s) 27 about the longitudinal axis A at the outer surface of the cylindrical barrel 20, so as to shred the filiform portions 41 which are extruded through the holes of the cylindrical barrel 20 into granules 42.

The cutting member 8 can be preferably realized according to what described in the European patent EP 2 237 868 B1 of the Applicant, whose contents (description and drawings) are deemed to be completely incorporated herein by way reference.

With reference to FIG. 1, the machine 1 can further preferably comprise an unloading chute 29 of the granules 42. The unloading chute 29 can be arranged under the perforated cylindrical barrel 20 for receiving the shredded granules 42 and feeds them to a conveyer device 30, for example a belt conveyor or an auger conveyor, arranged in turn under the unloading chute 29.

The machine 1 can further comprise preferably, but not necessarily, a distributor device 31 adapted to sprinkle the shredded granules 42 preferably, but not necessarily, with calcium carbonate CC, so as to maintain advantageously the separation thereof. The distributor device 31 can be preferably realized according to what described in the European patent EP 2 237 868 B1, whose contents (description and drawings) are deemed to be completely incorporated herein by way of reference.

The above-described machine is further preferably provided with an electronic unit 50 (FIG. 1) configured to control at least the compacting unit 3 and the shredding unit 5. The electronic unit 50 can be configured to operate according to what described in the European patent EP 2 237 868 B1, whose contents (description and drawings) are deemed to be completely incorporated herein by way of reference.

The functioning of the machine 1 will be described in the following.

With reference to FIG. 8, it is assumed that initially the piston 18 is in the first position, and that the compacted agglomerate AC is present in the chamber 14 and that the projecting part 21 is devoid of the bituminous residuals. The compacting step of the agglomerate AC in the chamber 14 can be carried out by means of the compacting unit 5 according to what described in the European patent EP 2 237 868 B1, whose contents (description and drawings) are deemed to be completely incorporated herein by way of reference.

With reference to FIGS. 8-15, the machine 1 is controlled by the electronic unit 50 for carrying out the extrusion step of the agglomerate AC formed by the portions 40. In this step, the electronic unit 50 controls the forward axial displacement of the piston 18 along the axis A from the first position (FIG. 8) towards the second position (FIG. 12). The piston 18 during its displacement axially compresses the compact agglomerate AC against the projecting part 21 (Figures from 9 to 12). In this step, the agglomerate 40 is radially pushed from the projecting part 21 towards the holes of the cylindrical barrel 20 which gives start to the extrusion. In this step, the openings 23 and the notches fill up with bituminous material, but not yet being adjacent to the holes of the barrel 20 they do not carry out the extrusion.

Figure 11:
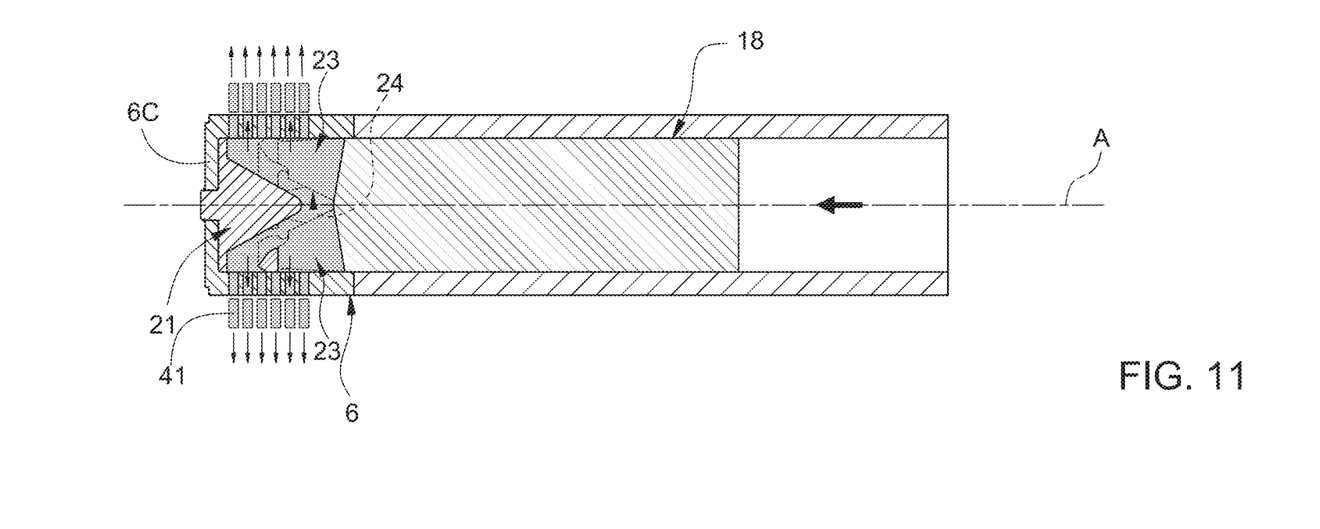

When the piston 18 is advanced in an axial position such that the openings 23 and the notches 25 approximately face the through-holes of the cylindrical barrel 20 (FIG. 10) unloading channels are created between the concave portion 22 and the holes of the cylindrical barrel 20 which cause the starting of the extrusion of the bituminous material outwards also through the openings 23 and the notches 25, with a greater pressure than the pressure to which the agglomerate AC at the projecting part 21 is subjected (FIG. 11).

In the displacement section close to reaching the second position (FIG. 11), the concave portion 22 is progressively engaged internally by the projecting part 21 which radially pushes the agglomerate AC towards the cylindrical barrel 20 mainly through the openings 23 which conveniently allow the emptying of the concave portion 22. During this step, the agglomerate AC is progressively cut into by the partition elements 24 which complete the separation of the same into slices when brought in abutment against the projecting part 21. During the extrusion operation, the electronic unit 50 controls the operating of the cutting unit 8 so as to shred into granules 42 the filiform portions 41 extruded from the holes of the cylindrical barrel 20.

After reaching the second position (FIG. 12), the electronic unit 50 controls the displacement of the piston 18 from the second to the first position (FIG. 3). In this step, the compacted bituminous material remained trapped inside the openings 23 provided with notches 25, slips out thereof and remains anchored to the projecting part 21 forming the wedge-shaped teeth DC, while the annular recess creates with the conical surface of the underlying projecting part 21 the connection crown of the wedge-shaped teeth DC. In this step, the notches 25 allow the extraction of the teeth DC which remain anchored onto the projecting part 21 through the crown, also following the moving back of the piston 18 into the first position.

When in a new shredding operation, the piston 18 is displaced again from the first to the second position (FIG. 14), the wedge-shaped teeth DC of hard and compact material present on the projecting part 21 axially stick in the compact agglomerate AC compressed by the piston 18 against the projecting part 21. The Applicant has found that the wedge-shaped teeth being of hard and compact material contribute to the division/fragmentation of the compact agglomerate AC during the following step.

The machine 1 described above has multiple advantages.

Firstly, owing to the particular shape of the head of the piston 18, provided with the openings 23 and with the partition elements 24, the shredding unit 5 prevents the increasingly greater accumulation of residual material on the surface of the projecting part 21 in the shape of disks at the base of the projecting part 21, which lead to the breaking of the shredding unit 6, since the material compressed against the projecting part 21 worsens the operating conditions of the shredding unit 6, until causing its breakdown.

In particular, this type of phenomenon is particularly noticeable in the case of portions 40 of bituminous material with a low content of bitumen and a high content of polyester.

Secondly, the shredding unit 5 of the machine 1 described above is capable of transmitting a greater force to the harder material, i.e. with less content of bitumen, which accumulates against the projecting part 21 at the end of the extraction step of the piston 18, with the consequent reduction in the quantity of material which accumulates against the projecting part 21 at each shredding operation.

Furthermore, owing to the particular geometry of the head of the piston 18 of the machine 1 described above, the efficiency of the recycling of the material increases, i.e. the portions 40 introduced being equal, the quantity of granules 42 produced increases.

Lastly, owing to the particular geometry of the head of the piston of the machine 1 described above, it is also possible to increase the life of the shredding unit 5, since it is possible to reduce the pressure applied onto the pressing member 7.

Finally, it is clear that modifications and variants can be made to the above-described machine without thereby departing from the scope of protection of the present invention according to what established by the appended claims.

The invention claimed is:

1. A machine for shredding portions of bituminous material in the solid-state into granules in the solid-state, comprising:
   shredding means comprising a perforated tubular body, which extends along a first axis and has at an axial end a wall provided with a projecting part protruding towards the internal space of said perforated tubular body,
   pressing means provided with a piston which is axially mobile inside said perforated tubular body along said axis and is provided on the head with an internal concave portion having a shape complementary to said projecting part,
   movement means adapted to displace said piston along said first axis towards said projecting part in order to axially compress said portions inside said perforated tubular body against said projecting part shaped so as to radially push said portions towards the through-holes present in said perforated tubular body so as to extrude the portions into filiform portions, and
   cutting means for cutting said filiform portions so as to shred them into granules,
   said machine being characterised in that:
   on the head of said piston one or more through-openings are made, which extend radially along a direction transversal to said longitudinal axis and are in communication with the internal space of said concave portion.

2. The machine according to claim 1, wherein said piston has a substantially cylindrical shape; said through-openings form radial channels on the head of said piston, which are adapted to unload the portions compressed and accumulated in said concave portion towards the through-holes present in said tubular body so as to extrude them into said filiform portions.

3. The machine according to claim 1, wherein said through-openings of said head of the piston are sized so as to increase the radial compression exerted by said projecting part against said portions accumulated in said concave portion, in response to the longitudinal compression of said piston against said projecting part.

4. The machine according to claim 1, wherein said piston comprises a plurality of through-openings angularly spaced from one another about said axis.

5. The machine according to claim 4, wherein each through-opening of the said plurality of through-openings comprises:
   at least two internal walls which face one another and extend radially towards the axis;
   wherein at least one of the at least two internal walls of each through-opening forms, with an internal wall of the at least two internal walls of an angularly adjacent through-opening of the plurality of through-openings, a partition edge which extends inside the concave portion and is shaped to cut into said portions during the axial compression thereof carried out by said piston against said projecting part.

6. The machine according to claim 5, wherein said partition edges have a triangular or wedge-shaped cross section orthogonal to the axis, wherein the tip of the partition edge faces towards the concave portion.

7. The machine according to claim 1, further comprising one or more longitudinal notches on the annular edge of the head of said piston, each of which extends parallel to the axis (A) from said edge until reaching a relative opening of the plurality of through-openings.

8. The machine according to claim 7, wherein said longitudinal notches are positioned on the head of the piston according to a distribution to traverse the corresponding openings of the plurality of openings in an angularly alternated manner.

9. The machine according to claim 1, wherein the annular edge of the head of the piston is shaped so as to have an annular recess along the inner side thereof facing the concave portion.

10. The machine according to claim 9, wherein said annular recess forms, along the inner side of the edge of the head of the piston, a discontinuous circular ring radially protruding towards said projecting part.

\* \* \* \* \*